US012281778B2

(12) United States Patent
Fu

(10) Patent No.: US 12,281,778 B2
(45) Date of Patent: Apr. 22, 2025

(54) PROJECTION DEVICE WITH DYNAMIC LIGHT EFFECT

(71) Applicant: Jiangcan Fu, Dongguan (CN)

(72) Inventor: Jiangcan Fu, Dongguan (CN)

( * ) Notice: Subject to any disclaimer, the term of this patent is extended or adjusted under 35 U.S.C. 154(b) by 0 days.

(21) Appl. No.: 18/761,107

(22) Filed: Jul. 1, 2024

(65) Prior Publication Data

US 2025/0012427 A1 Jan. 9, 2025

(30) Foreign Application Priority Data

Jul. 7, 2023 (CN) ......................... 202321781720.7

(51) Int. Cl.

*F21V 14/08* (2006.01)
*F21V 5/00* (2018.01)
*F21Y 115/10* (2016.01)
*F21W 121/00* (2006.01)
*F21Y 113/00* (2016.01)

(52) U.S. Cl.

CPC .............. *F21V 14/08* (2013.01); *F21V 5/008* (2013.01); *F21W 2121/008* (2013.01); *F21Y 2113/00* (2013.01); *F21Y 2115/10* (2016.08)

(58) Field of Classification Search

CPC .. F21W 2121/008; F21S 10/007; F21S 10/00; F21V 14/08; F21V 14/00; F21Y 2113/00; F21Y 2115/10

See application file for complete search history.

(56) References Cited

FOREIGN PATENT DOCUMENTS

| | | | | | |
|---|---|---|---|---|---|
| CN | 109973912 A | * | 7/2019 | | F21S 10/00 |
| CN | 114527620 A | | 5/2022 | | |
| GB | 2329011 A | * | 3/1999 | | B61L 5/1827 |
| WO | WO-2021140932 A1 | * | 7/2021 | | B60Q 1/34 |

OTHER PUBLICATIONS

Innovation Q+ NPL (Year: 2024).*

* cited by examiner

*Primary Examiner* — Anabel Ton
(74) *Attorney, Agent, or Firm* — Birchwood IP

(57) ABSTRACT

A projection device with dynamic light effect is provided, which includes at least one LED light source, a condensing lens, at least one external projection mono-convex lens, and further includes at least one filter. The filter is located between the condensing lens and the external projection mono-convex lens, an out-light surface of the condensing lens is provided with a first ripple. An upper and/or a lower surface of the filter are provided with a second ripple; being refracted by an interference pattern on the first ripple through the condensing lens, emitted light corresponding to the interference pattern on the first ripple is formed. Then, the light passes through the filter and undergoes two refractions. The light is refracted by the interference pattern on the second ripple, resulting in a refraction effect of the interference pattern superimposed on the first ripple and second ripple.

9 Claims, 7 Drawing Sheets

PROJECTION DEVICE WITH DYNAMIC LIGHT EFFECT

CROSS-REFERENCE TO RELATED APPLICATIONS

This application claims priority to Chinese Patent Application No. 202321781720.7, filed on Jul. 7, 2023, which is hereby incorporated by reference in its entirety.

TECHNICAL FIELD

The present disclosure relates to the field of projection light technologies, and in particular, to a new projection device with dynamic light effect.

BACKGROUND

The starry projection device is commonly used in some indoor places and is a projection device that can generate dynamic nebula effects. It can create a starry sky environment, which is beneficial for people to relieve fatigue and stress caused by work for a day and has a good decorative effect.

A starry projection device is disclosed in patent with an application number of CN114527620A, which includes at least one beam generator; a condensing lens with patterns, at least one side of the condensing lens with patterned is provided with a pattern, and at least one beam generator is located on an opposite side of a patterned surface of the condensing lens. The beam generated by the beam generator is irradiated along an incident light path on the opposite side of the patterned surface of the condensing lens; the device further includes at least one imaging lens, the imaging lens is located on an outgoing light path of the patterned condensing lens, and the light beam emitted from the patterned surface of the patterned condensing lens passes through the at least one imaging lens along the outgoing light path to form a moving nebula projection; the projected light only passes through a single-layer pattern on the condensing lens, resulting in a relatively monotonous projection pattern formed by refraction, and a relatively poor sense of hierarchy and stereoscopy.

SUMMARY

In view of this, the purpose of the present disclosure is to provide a novel projection device with dynamic light effect for solving the problems of poor hierarchical and three-dimensional sense of projection patterns in existing projection devices.

In order to solve the above-mentioned technical problems, the technical solution of the present disclosure is that a projection device, including at least one LED light source, configured to generate a light beam;

- a condensing lens, configured to concentrate the light beam generated by LED light source;
- at least one external projection mono-convex lens;
- where the projection device further includes at least one filter, the filter is located between the condensing lens and the external projection mono-convex lens, an outlight surface of the condensing lens is provided with a first ripple, and an upper and/or a lower surface of the filter are provided with a second ripple; the first ripple and second ripple both include an interference pattern that is formed by protruding outward and/or depressing inward and is configured to interfere with light rays.

In an embodiment of the present disclosure, the LED light source, the condensing lens, the external projection mono-convex lens, and the filter are located on the same axis, which facilitates the light to fully pass through the patterns on the condensing lens and filter, thereby facilitating a formation of a complete pattern distributed in a circular array based on interference patterns, and the projection range is also larger.

In an embodiment of the present disclosure, a driving mechanism is provided on one side of the filter to drive the filter to rotate or move horizontally back and forth between the condensing lens and the external projection mono-convex lens.

In an embodiment of the present disclosure, the driving mechanism includes a first rotating motor, a first biased rotating shaft, and a spring; the first biased rotating shaft is fixedly installed on an output shaft of the first rotating motor; and one side of the filter is provided with a hinge hole hinged with the first biased rotating shaft, the other side of the filter is hinged or fixed with the spring; the other end of the spring is fixedly connected to a housing of the projection device.

In an embodiment of the present disclosure, the driving mechanism includes a second rotating motor, a second biased rotating shaft, and a sliding groove; the sliding groove is fixedly connected to the housing of the projection device;

- the filter slides in a straight line within the sliding groove; the filter is provided with a wire slot hole;
- the second biased rotating shaft is fixedly installed on an output shaft of the second rotating motor, and one end of the second biased rotating shaft is provided in the wire slot hole, the filter is movably connected to the second biased rotating shaft through the wire slot hole.

In an embodiment of the present disclosure, the driving mechanism includes a third rotating motor, a first gear, and a second gear;

- the first gear is provided on one side of the filter;
- the second gear is fixedly installed on an output shaft of the third rotating motor and is engaged with the first gear;
- the filter is driven by the third rotating motor to rotate through an engagement transmission between the first gear and the second gear.

In an embodiment of the present disclosure, one side of the condensing lens is provided with a rotating mechanism configured to drive the condensing lens to rotate.

In an embodiment of the present disclosure, the rotating mechanism includes a first turntable and a fourth rotating motor that is configured to drive the first turntable to rotate, and the condensing lens is fixed on the first turntable; an edge of the first turntable is provided with a ring gear, and an output shaft of the fourth rotating motor is fixedly provided with a third gear, the third gear engages with the ring gear.

In an embodiment of the present disclosure, the rotating mechanism includes a fifth rotating motor, a second turntable, a belt, a first pulley, and a second pulley; the condensing lens is fixed on the second turntable, the first pulley is fixedly installed on an output shaft of the fifth rotating motor, the second pulley is fixedly installed on the second turntable, the belt is sleeved on the first pulley and the second pulley, and a torque of the fifth rotating motor is outputted to the second turntable and the condensing lens through the belt, thereby driving the second turntable and the condensing lens to rotate.

The technical effect of the present disclosure is that, compared with existing technologies, the condensing lens is refracted by the interference pattern on the first ripple, thereby forming an emitted light corresponding to the interference pattern on the first ripple. Then, the light passes through the filter and undergoes two refractions, where the light is affected by the interference pattern on the second ripple, resulting in a refractive effect of the interference pattern superposition of the first ripple and the second ripple. Then, the light enters the external projection mono-convex lens for diffusion and emission, and finally can project a multi-level and stereoscopic effect in the projected pattern.

Figure 1:
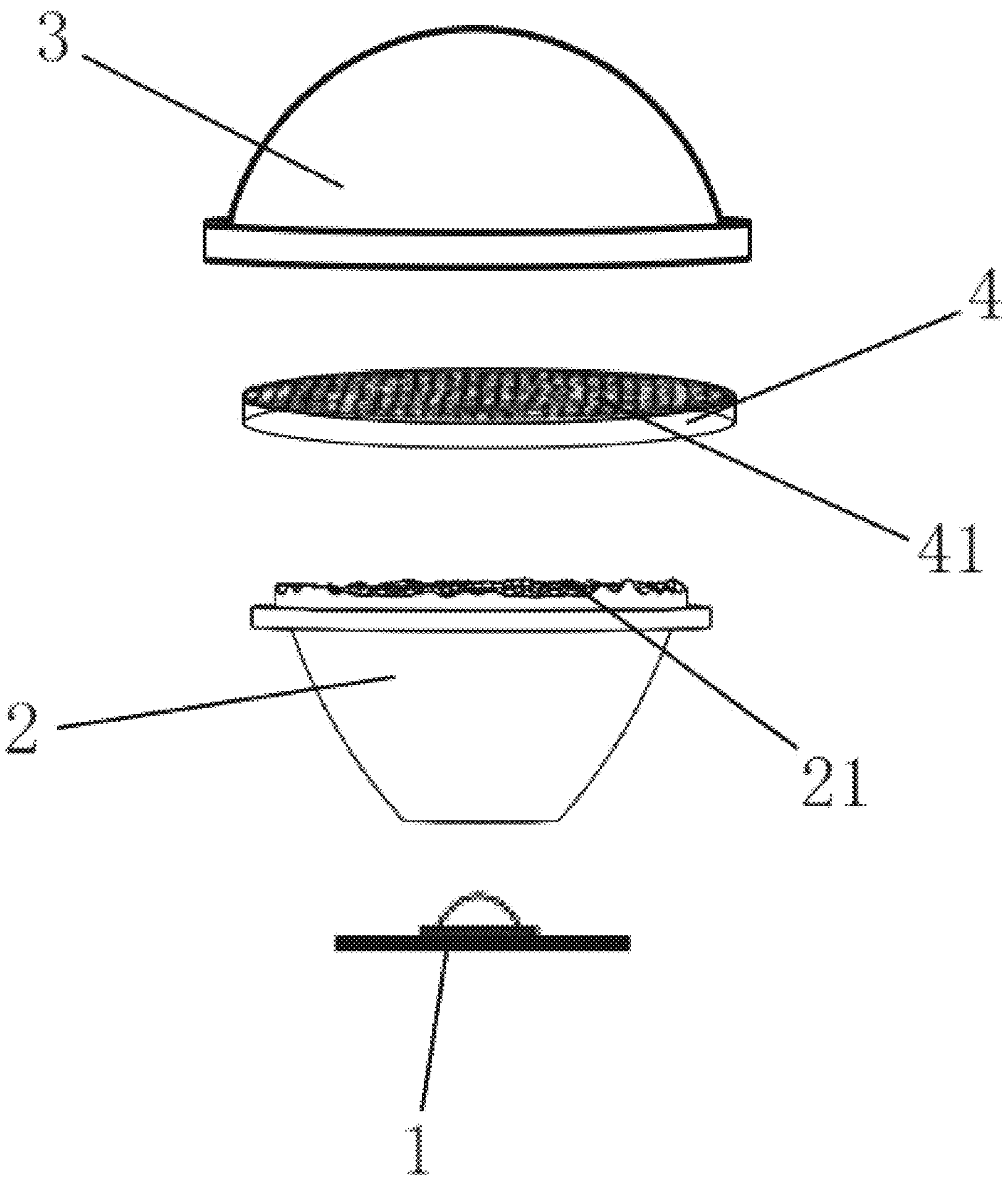
FIG. 1 is a structural schematic diagram of Embodiment 1.

Numeral reference: 1—LED light source, 2—condensing lens, 21—first ripple, 3—external projection mono-convex lens, 4—filter, 41—second ripple, 5—driving mechanism, 51—first rotating motor, 52—first biased rotating shaft, 53—spring, 54—hinge hole, 55—second rotating motor, 56—second biased rotating shaft, 57—sliding groove, 58—wire slot hole, 501—third rotating motor, 502—first gear, 503—second gear, 6—rotating mechanism, 61—first turntable, 62—fourth rotating motor, 63—ring gear, 64—third gear, 65—fifth rotating motor, 66—second turntable; 67—belt, 68—first pulley, 69—second pulley.

DESCRIPTION OF EMBODIMENTS

The specific embodiments of the present disclosure will be further elaborated in combination with the accompanying drawings to render the technical solution of the present disclosure easier to understand.

In the embodiments, it should be understood that terms "middle", "top", "bottom", "top", "right", "left", "top", "back", "center", etc. indicate an orientation or position relationship based on the orientation or position relationships shown in the drawings, only for a purpose of describing the present disclosure, and not to indicate or imply that the device or member referred to must have a specific orientation, be constructed and operated in a specific orientation, and therefore cannot be understood as a limitation of the present disclosure.

Furthermore, in the specific embodiment, if the connection or fixation manner between components is not specifically specified, the connection or fixation manner can be through commonly used a bolt fixation, a nail-pin fixation, or a pin-shaft connection in the prior art. Therefore, it will not be elaborated in the embodiment.

Embodiment 1

In this embodiment, a projection device is disclosed, as shown in FIG. 1, which includes at least one LED light source 1 configured to generate a beam of light, a condensing lens 2 configured to concentrate the light beam generated by the LED light source 1; at least one external projection mono-convex lens 3; and further includes at least one filter 4, where the filter 4 is located between the condensing lens 2 and the external projection mono-convex lens 3, an out-light surface of the condensing lens 2 is provided with a first ripple 21, and an upper and/or a lower surface of the filter 4 is provided with a second ripple 41; the first ripple 21 and the second ripple 41 both include an interference patterns that is formed by protruding outward and/or depressing inward and is configured to interfere with light rays; where the interference patterns on the condensing lens 2 and the filter 4 are similar or consistent, and a convex surface of the external projection mono-convex lens 3 is provided upwards.

The condensing lens 2 is refracted by the interference pattern on the first ripple 21, thereby forming an emitted light corresponding to the interference pattern on the first ripple 21. Then, the light passes through the filter 4 and undergoes two refractions, where the light is affected by the interference pattern on the second ripple 41, resulting in a refractive effect of the interference pattern superposition of the first ripple 21 and the second ripple 41. The light then enters the external projection mono-convex lens 3 for diffusion and emission, ultimately projecting a multi-level and three-dimensional projection pattern.

In this embodiment, the interference patterns of the first ripple 21 and the second ripple 41 are both formed by protruding upward, which can refer to a vortex pattern design disclosed in the patent of CN307701193S and CN307701192S.

Embodiment 2

Figure 2:
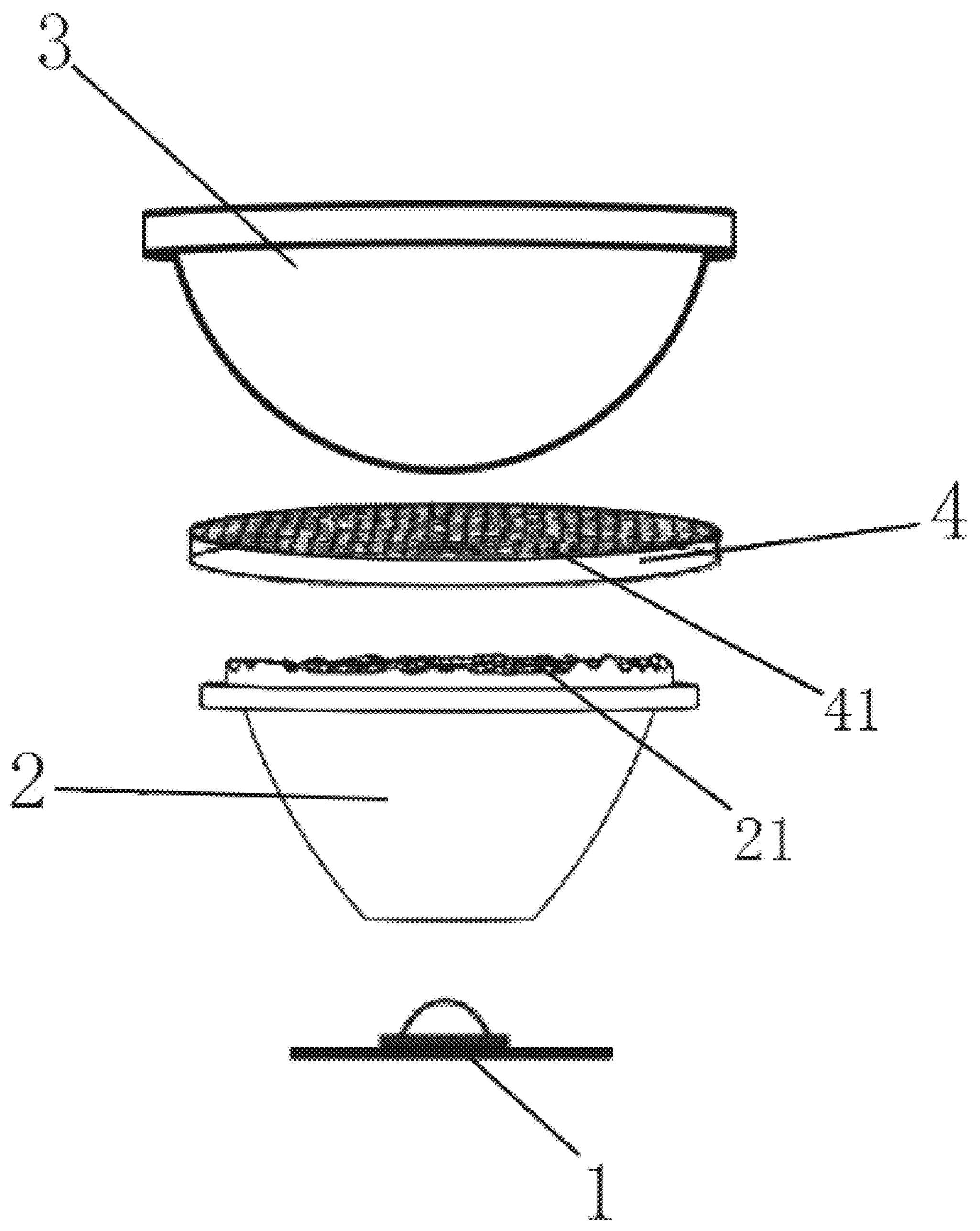
FIG. 2 is a structural schematic diagram of Embodiment 2.

In this embodiment, as shown in FIG. 2, the difference compared to Embodiment 1 is that the convex surface of the external projection mono-convex lens 3 is provided downwards; when the convex surface of the external projection mono-convex lens 3 is provided downwards, it is beneficial to obtain a larger and inverted projection effect.

In an implementation, the LED light source 1, the condensing lens 2, the external projection mono-convex lens 3, and the filter 4 are located on the same axis, which facilitates the light to fully pass through the patterns on the condensing lens 2 and filter 4, thereby facilitating a formation of a complete light pattern distributed in a circular array based on the interference pattern projection, and the projection range is also larger.

Embodiment 3

In this embodiment, the difference compared to Embodiment 2 is that a driving mechanism 5 is provided on one side of the filter 4 so as to drive the filter 4 to perform reciprocating or rotational motion. Through the reciprocating or rotational motion of the filter 4, the filter 4 moves relative to the light emitted from the condensing lens 2, resulting in a dynamic gradient and multi-level stereoscopic effect in the projected image.

In this embodiment, at least one filter 4 is provided; when there are more than 2 filters 4, each filter 4 can be provided with a corresponding set of driving mechanisms 5 or no driving mechanisms 5 as needed.

Embodiment 4

Figure 3:
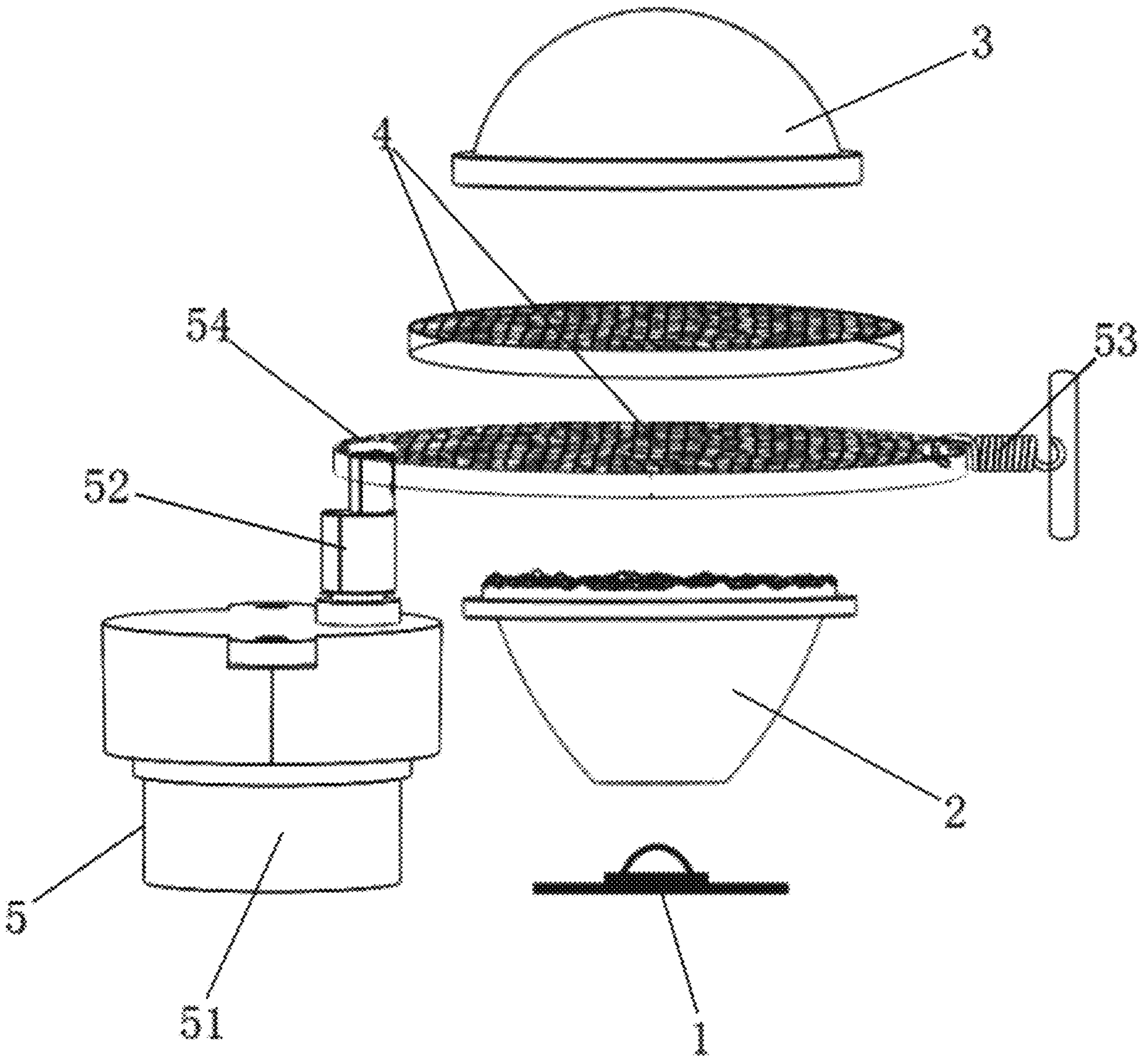
FIG. 3 is a structural schematic diagram of Embodiment 4.

In this embodiment, as shown in FIG. 3, In an implementation, the driving mechanism 5 includes a first rotating motor 51, a first biased rotating shaft 52, and a spring 53; the first biased rotating shaft 52 is fixedly installed on an output shaft of the first rotating motor 51, one side of the filter 4 is provided with a hinge hole 54 hinged with the first biased rotating shaft 52; the other side of the filter 4 is hinged or fixed with the spring 53; the other end of the spring 53 is fixedly connected to a housing of the projection device. Under a continuous rotation of the first rotating motor 51, the biased rotation shaft drives the filter 4 to move back and forth, resulting in a relative movement between the filter 4 and an original optical path, thereby facilitating the formation of a dynamic gradient and multi-level stereoscopic effect in the projected image.

Embodiment 5

Figure 4:
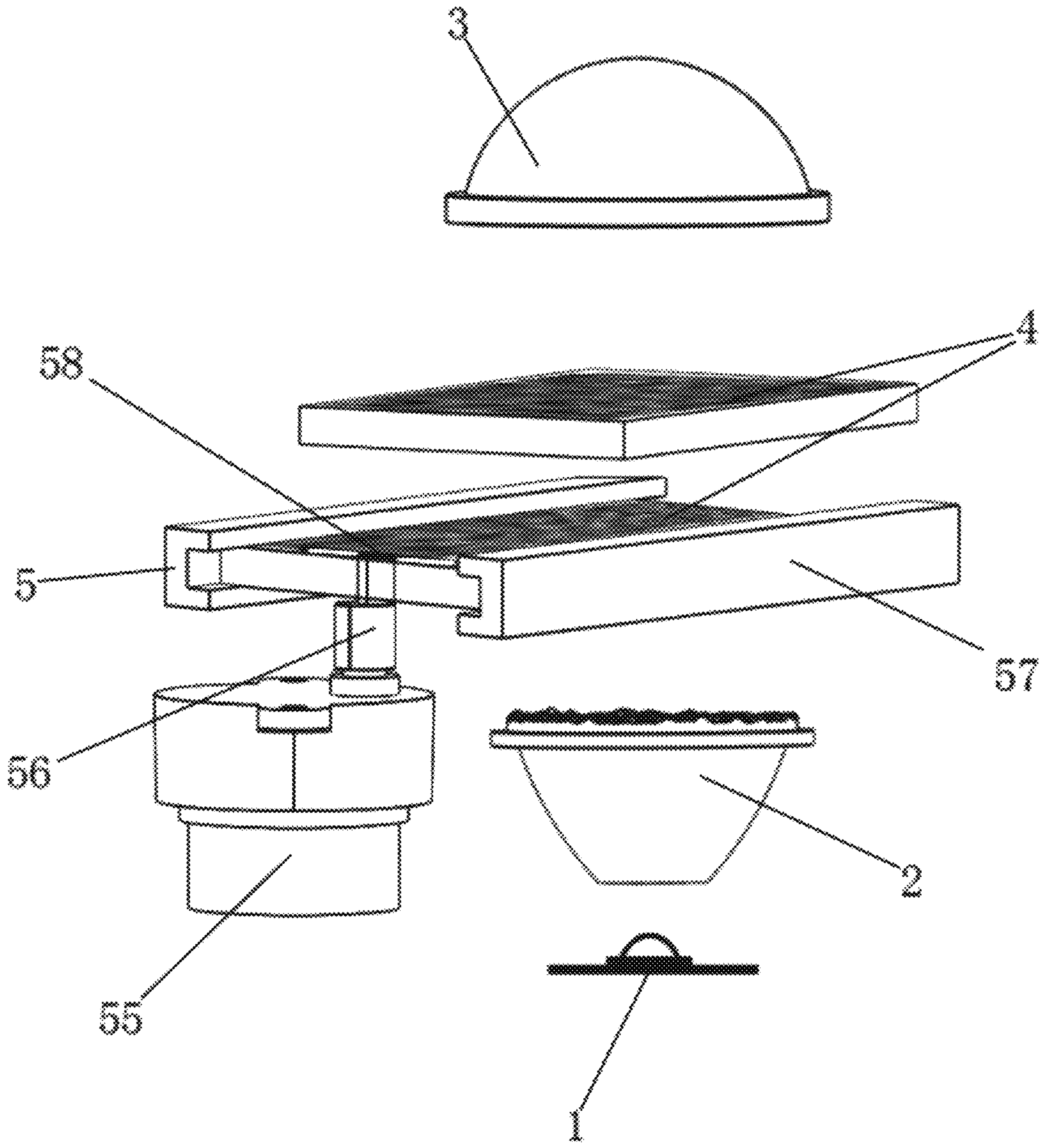
FIG. 4 is a structural schematic diagram of Embodiment 5.

In this embodiment, as shown in FIG. 4, the difference compared to Embodiment 4 is that the driving mechanism 5 includes a second rotating motor 55, a second biased rotating shaft 56, and a sliding groove 57; the sliding groove 57 is fixedly connected to the housing of the projection device.

The filter 4 slides in a straight line within the sliding groove 57; a wire slot hole 58 is provided on the filter 4.

The second biased rotating shaft 56 is fixedly installed on an output shaft of the second rotating motor 55, and one end of the second biased rotating shaft 56 is provided in the wire slot hole 58. The filter 4 is movably connected to the second biased rotating shaft 56 through the wire slot hole 58; by rotating the second rotating motor 55 and driving the second biased rotating shaft 56 to rotate in a biased manner, the filter 4 can achieve reciprocating motion under the cooperation of the wire slot hole 58 and the second biased rotating shaft 56, thereby causing the relative movement between the filter 4 and the original optical path, and facilitating the formation of a dynamic gradient and multi-level stereoscopic effect in the projected image.

In this embodiment, the wire slot hole 58 is a straight groove on the filter 4. When the second biased rotating shaft 56 achieves an eccentric rotation under a rotation of the second rotating motor 55, the second biased rotating shaft 56 abuts against an inner wall of the wire slot hole 58, thereby generating a component force that drives the filter to move towards the sliding groove 57.

In an implementation, in order to avoid an interference with the rotation of the second biased rotating shaft 56 by the wire slot hole 58, a length of the wire slot hole 58 should be greater than a rotation diameter of the second biased rotating shaft 56.

Embodiment 6

Figure 5:
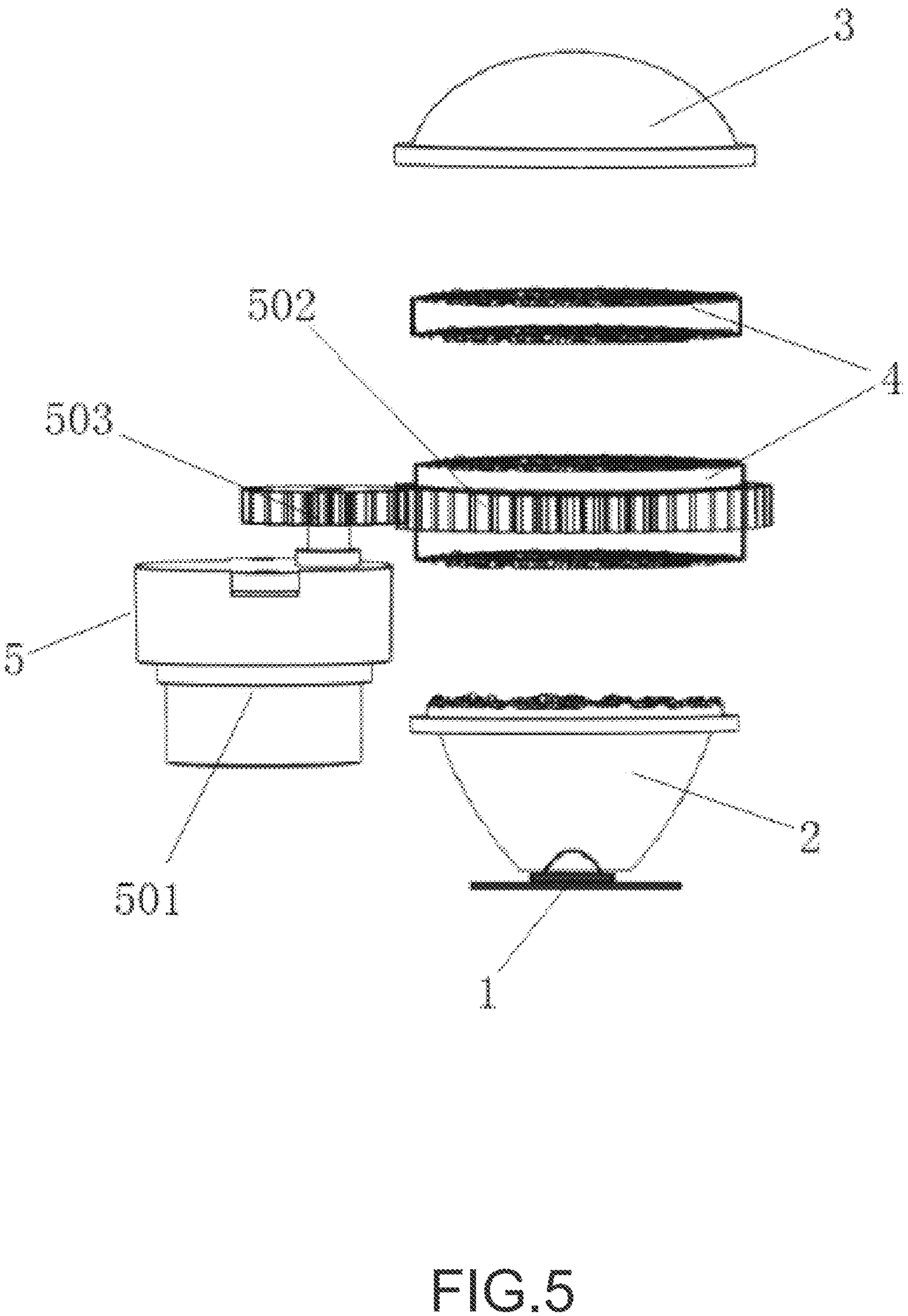
FIG. 5 is a structural schematic diagram of Embodiment 6.

In this embodiment, as shown in FIG. 5, the difference compared to Embodiments 4 and 5 is that the driving mechanism 5 includes a third rotating motor 501, a first gear 502, and a second gear 503.

The first gear 502 is provided on one side of the filter 4.

The second gear 503 is fixedly installed on an output shaft of the third rotating motor 501 and is engaged with the first gear 502.

The third rotating motor 501 drives the filter 4 to rotate through an engagement transmission of the first gear 502 and the second gear 503. The third rotating motor 501 drives the filter 4 to rotate, causing the relative movement between the filter 4 and the original optical path, thereby facilitating the formation of a rotating and stereoscopic effect in the projected image.

Embodiment 7

Figure 6:
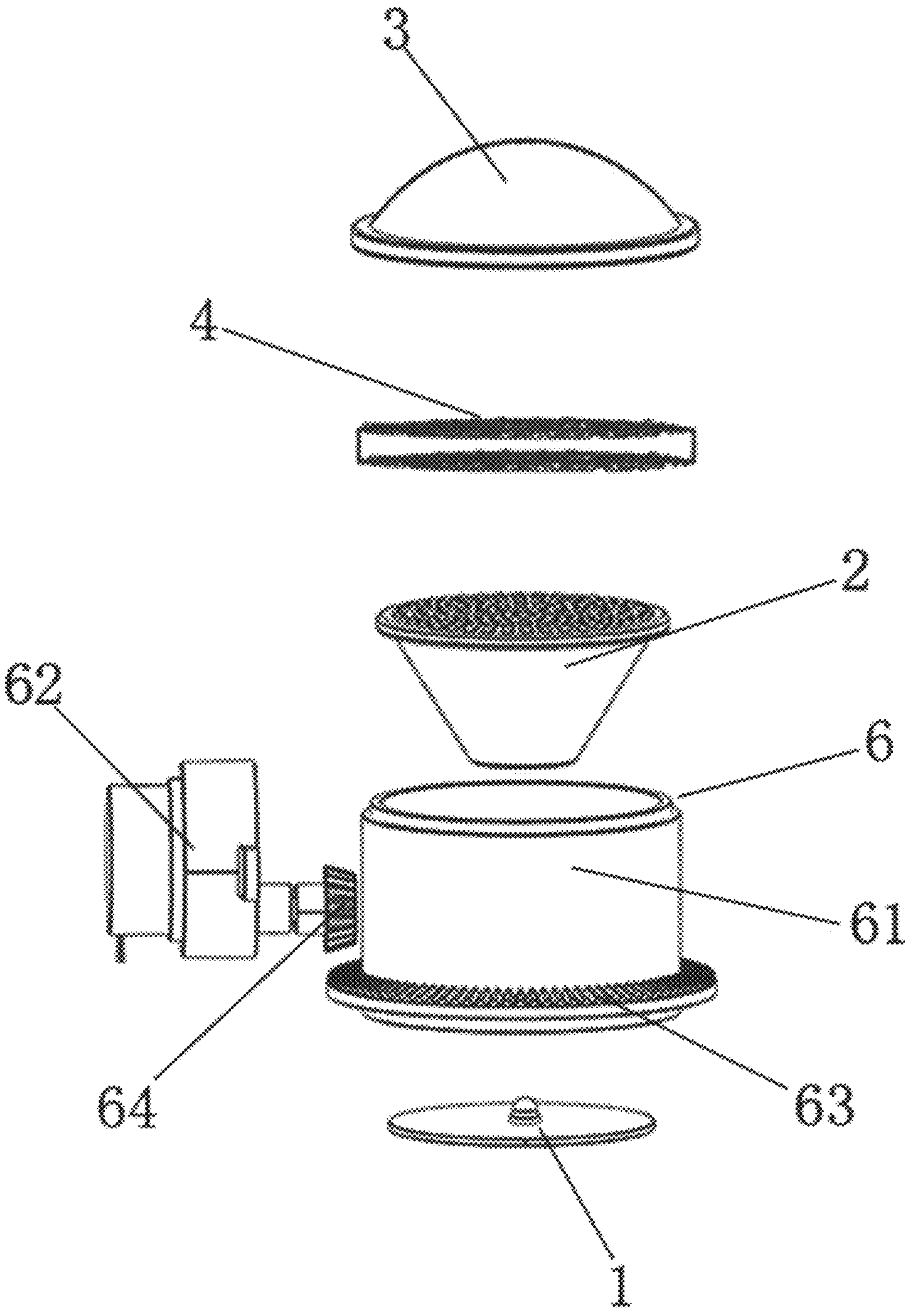
FIG. 6 is a structural schematic diagram of Embodiment 7.

In this embodiment, as shown in FIG. 6, a rotating mechanism 6 is provided on one side of the condensing lens 2 to drive the condensing lens 2 to rotate. In an implementation, the rotating mechanism 6 includes a first turntable 61 and a fourth rotating motor 62 that is configured to drive the first turntable 61 to rotate, and the condensing lens 2 is fixed on the first turntable 61; an edge of the first turntable 61 is provided with a ring gear 63, and a third gear 64 is fixedly installed on an output shaft of the fourth rotating motor 62. The third gear 64 engages with the ring gear 63, and the first turntable 61 and the condensing lens 2 are driven to rotate through the fourth rotating motor 62, so that the light emitted from the condensing lens 2 dynamically shone onto the filter 4, facilitating the formation of a dynamic gradient and multi-level stereoscopic effect in the projected image.

Embodiment 8

Figure 7:
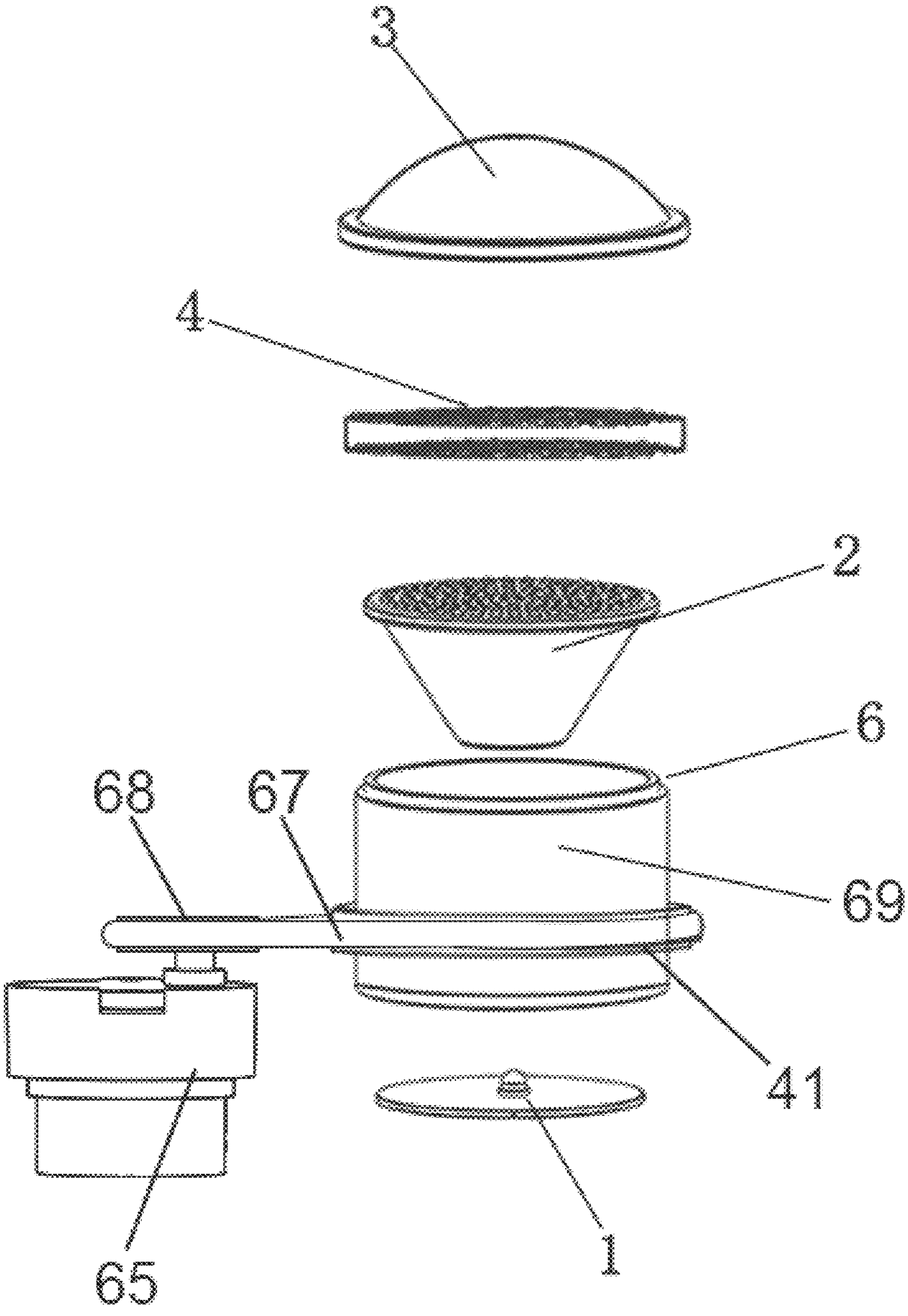
FIG. 7 is a structural schematic diagram of Embodiment 8.

In this embodiment, as shown in FIG. 7, the difference from Embodiment 7 is that the rotating mechanism 6 includes a fifth rotating motor 65, a second turntable 66, a belt 67, a first pulley 68, and a second pulley 69; the condensing lens 2 is fixed on the second turntable 66, the first pulley 68 is fixedly installed on an output shaft of the fifth rotating motor 65, the second pulley 69 is fixedly installed on the second turntable 66, and the belt 67 is sleeved on the first pulley 68 and the second pulley 69. A torque of the fifth rotating motor 65 is outputted to the second turntable 66 and the condensing lens 2 through the belt 67, thereby driving the second turntable 66 and the condensing lens 2 to rotate; the fifth rotating motor 65 is used to drive the condensing lens 2 to rotate, the light emitted from the condensing lens 2 is dynamically shone onto the filter 4, facilitating the projection of a dynamic gradient and multi-level stereoscopic effect in the projected image.

It should be noted that a pulley type transmission composed of the belt 67, the first pulley 68, and the second pulley 69 in this embodiment is only used to drive the compact condensing lens 2, so there is no need to provide a belt tensioning mechanism.

Correspondingly, the belt, first pulley, and second pulley in this embodiment can be replaced with a synchronous belt, a first synchronous wheel, and a second synchronous wheel, with the same effect after replacement.

The technical effect of the present disclosure is that, compared with existing technologies, the condensing lens is refracted by the interference pattern on the first ripple, thereby forming an emitted light corresponding to the interference pattern on the first ripple. Then, the light passes through the filter and undergoes two refractions, where the light is affected by the interference pattern on the second ripple, resulting in a refractive effect of the interference pattern superposition of the first ripple and the second ripple. Then, the light enters the external projection mono-convex lens for diffusion and emission, and finally can project a multi-level and stereoscopic effect in the projected pattern.

Of course, the above are only exemplary embodiments of the present disclosure. In addition, there may be various other embodiment of the present disclosure. Any technical solutions formed by equivalent replacement or equivalent transformation fall within the protection scope of the present disclosure.

What is claimed is:

1. A projection device with dynamic light effect, comprising:

at least one LED light source, configured to generate a light beam;

a condensing lens, configured to concentrate the light beam generated by LED light source;

at least one external projection mono-convex lens;

wherein the projection device further comprises at least one filter, the filter is located between the condensing lens and the external projection mono-convex lens, an out-light surface of the condensing lens is provided with a first ripple, and an upper and/or a lower surface of the filter are provided with a second ripple; the first ripple and second ripple both comprise an interference pattern that is formed by protruding outward and/or depressing inward and is configured to interfere with light rays;

wherein a length of one edge of the condensing lens that is close to the LED light source is smaller than a length of the other edge of the condensing lens that is far away from the LED light source.

2. The projection device according to claim 1, wherein the LED light source, the condensing lens, the external projection mono-convex lens, and the filter are located on the same axis.

3. The projection device according to claim 1, wherein a driving mechanism is provided on one side of the filter so as to drive the filter to rotate or move horizontally back and forth between the condensing lens and the external projection mono-convex lens.

4. The projection device according to claim 3, wherein the driving mechanism comprises a first rotating motor, a first biased rotating shaft, and a spring; the first biased rotating shaft is fixedly installed on an output shaft of the first rotating motor; and one side of the filter is provided with a hinge hole hinged with the first biased rotating shaft, the other side of the filter is hinged or fixed with the spring; the other end of the spring is fixedly connected to a housing of the projection device.

5. The projection device according to claim 3, wherein the driving mechanism comprises a second rotating motor, a second biased rotating shaft, and a sliding groove; the sliding groove is fixedly connected to the housing of the projection device;

the filter slides in a straight line within the sliding groove; the filter is provided with a wire slot hole;

the second biased rotating shaft is fixedly installed on an output shaft of the second rotating motor, and one end of the second biased rotating shaft is provided in the wire slot hole, the filter is movably connected to the second biased rotating shaft through the wire slot hole.

6. The projection device according to claim 3, wherein the driving mechanism comprises a third rotating motor, a first gear, and a second gear;

the first gear is provided on one side of the filter;

the second gear is fixedly installed on an output shaft of the third rotating motor and is engaged with the first gear, the filter is driven by the third rotating motor to rotate through an engagement transmission between the first gear and the second gear.

7. The projection device according to claim 1, wherein one side of the condensing lens is provided with a rotating mechanism configured to drive the condensing lens to rotate.

8. The projection device according to claim 7, wherein the rotating mechanism comprises a first turntable and a fourth rotating motor that is configured to drive the first turntable to rotate, and the condensing lens is fixed on the first turntable; an edge of the first turntable is provided with a ring gear, and an output shaft of the fourth rotating motor is fixedly provided with a third gear, the third gear engages with the ring gear.

9. The projection device according to claim 7, wherein the rotating mechanism comprises a fifth rotating motor, a second turntable, a belt, a first pulley, and a second pulley; the condensing lens is fixed on the second turntable, the first pulley is fixedly installed on an output shaft of the fifth rotating motor, the second pulley is fixedly installed on the second turntable, the belt is sleeved on the first pulley and the second pulley, and a torque of the fifth rotating motor is outputted to the second turntable and the condensing lens through the belt, thereby driving the second turntable and the condensing lens to rotate.

* * * * *